(12) United States Patent  (10) Patent No.: US 12,479,212 B2
Seo et al.  (45) Date of Patent: Nov. 25, 2025

(54) IDENTIFYING STATE OF CARTRIDGE FROM THE RESULT OF SCANNING THE PRINT

(71) Applicant: Hewlett-Packard Development Company, L.P., Spring, TX (US)

(72) Inventors: Jungil Seo, Seongnam Si (KR); Haengnan Kim, Seongnam Si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 143 days.

(21) Appl. No.: 18/683,026

(22) PCT Filed: Jan. 24, 2022

(86) PCT No.: PCT/US2022/013464
§ 371 (c)(1),
(2) Date: Feb. 12, 2024

(87) PCT Pub. No.: WO2023/018444
PCT Pub. Date: Feb. 16, 2023

(65) Prior Publication Data
US 2024/0424803 A1  Dec. 26, 2024

(30) Foreign Application Priority Data
Aug. 13, 2021  (KR) ........................ 10-2021-0107338

(51) Int. Cl.
B41J 2/175 (2006.01)
B41J 29/00 (2006.01)
(Continued)

(52) U.S. Cl.
CPC .......... *B41J 2/17566* (2013.01); *B41J 29/00* (2013.01); *G03G 15/0856* (2013.01);
(Continued)

(58) Field of Classification Search
CPC ...... B41J 2/17566; B41J 29/00; B41J 29/393; B41J 2/17; B41J 3/46; B41J 2029/3935;
(Continued)

(56) References Cited

U.S. PATENT DOCUMENTS 6,188,413 B1  2/2001  Kang
6,335,978 B1  1/2002  Moscato et al.
(Continued)

FOREIGN PATENT DOCUMENTS

JP  2002-199208 A  7/2002
JP  2011-060123 A  3/2011
(Continued)

*Primary Examiner* — Thinh H Nguyen
(74) *Attorney, Agent, or Firm* — Brooks, Cameron & Huebsch, PLLC

(57) ABSTRACT

An example image forming apparatus includes a print module, a scanning module, a processor, and a memory to store at least one instruction executable by the processor. The processor is to execute the at least one instructions to obtain remaining amount information about the remaining amount of the toner or ink, control the print module to output a first printout using print data, control the scanning module to obtain a printout image by scanning the first printout, identify a quality of the first printout based on the output image and the print data, and obtain cartridge status information based on the identified quality of the first output and the remaining amount information.

15 Claims, 11 Drawing Sheets

(51) Int. Cl.
  *G03G 15/00* (2006.01)
  *G03G 15/08* (2006.01)
  *G06F 3/12* (2006.01)
  *H04N 1/04* (2006.01)

(52) U.S. Cl.
  CPC ..... *G03G 15/5016* (2013.01); *G03G 15/5079* (2013.01); *G06F 3/1208* (2013.01); *G06F 3/1229* (2013.01); *G06F 3/1288* (2013.01); *H04N 1/04* (2013.01)

(58) Field of Classification Search
  CPC ........... G03G 15/0856; G03G 15/5016; G03G 15/5079; G03G 15/556; G06F 3/1208; G06F 3/1229; G06F 3/1288; G06F 3/1285; G06F 3/121; G06F 3/1235; H04N 1/04; H04N 1/2346; H04N 1/00042; H04N 1/00029; H04N 1/00047; G06Q 10/20; G06Q 30/0601; G06Q 50/10
  See application file for complete search history.

(56) References Cited

U.S. PATENT DOCUMENTS

| | | | |
|---|---|---|---|
| 6,644,773 | B2 | 11/2003 | Bildstein et al. |
| 2007/0081829 | A1 | 4/2007 | Funayama et al. |
| 2009/0175632 | A1 | 7/2009 | Kim |
| 2013/0135631 | A1 | 5/2013 | Lin |
| 2015/0168868 | A1* | 6/2015 | Saito .................... G03G 15/556 399/27 |
| 2016/0291905 | A1 | 10/2016 | Subbaian et al. |
| 2020/0225885 | A1 | 7/2020 | Akimoto et al. |

FOREIGN PATENT DOCUMENTS

| | | |
|---|---|---|
| JP | 2014-077884 A | 5/2014 |
| JP | 2019-144359 A | 8/2019 |

* cited by examiner

FIG. 9

```
                                                              ╱900
┌─────────────────────────────────────────────────────────────────┐
│ Quality Threshold Value                                         │
│ ─────────────────────────────────────────────────────────────── │
│ Cyan Quality Threshold Value        [ 50% ]   (Default Val. 50%)│
│                                                                 │
│ Magenta Quality Threshold Value     [ 50% ]   (Default Val. 50%)│
│                                                                 │
│ Yellow Quality Threshold Value      [ 50% ]   (Default Val. 50%)│
│                                                                 │
│ Black Quality Threshold Value       [ 50% ]   (Default Val. 50%)│
└─────────────────────────────────────────────────────────────────┘
```

FIG. 11

```
┌─────────────────────────────────────────── 1100
│ Check toner/ink shortage
│ ─────────────────────────────────────────
│  ◎ Every page
│  ◎ Every job (1ˢᵗ page of ever job)
│  ◎ Daily (1ˢᵗ job in a day)
│  ◎ Specified period
│  ◉ Do not check shortage (Default)
└─────────────────────────────────────────
```

IDENTIFYING STATE OF CARTRIDGE FROM THE RESULT OF SCANNING THE PRINT

CROSS-REFERENCE TO RELATED APPLICATIONS

This application is based on and claims priority to Korean Patent Application No. 10-2021-0107338, filed on Aug. 13, 2021 in the Korean Intellectual Property Office, the disclosure of which is incorporated by reference herein in its entirety.

BACKGROUND

An image forming apparatus may receive a storage format for a scanned document, a file name, and setting information about a destination to which the scanned document is to be transmitted. Based on a scan operation command for a certain document being received, the image forming apparatus may perform a scan operation based on the setting information. The image forming apparatus may perform an output operation in response to a received output operation command. The quality of a printout that is output from the image forming apparatus may be deteriorated due to various causes.

BRIEF DESCRIPTION OF THE DRAWINGS

Various examples will be described below by referring to the following figures.

FIG. 9 is a view illustrating a method for an image forming apparatus to set a threshold value for evaluating a quality of a printout according to an example.

FIG. 11 is a view illustrating a period in which an image forming apparatus is to identify a quality of a printout according to an example.

DETAILED DESCRIPTION

Figure 1:
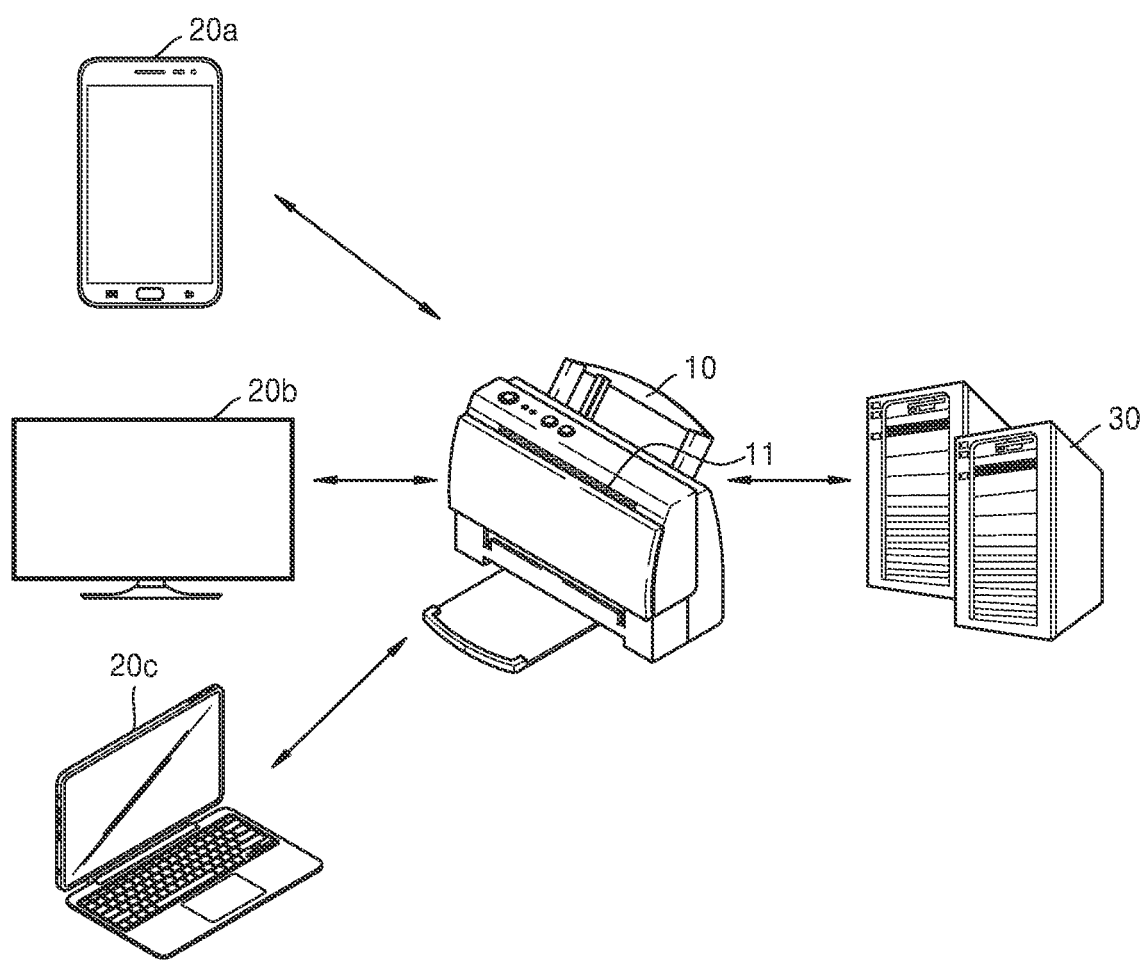
FIG. 1 illustrates an image forming apparatus that is to obtain cartridge status information based on a result of scanning a printout according to an example.

Below, a description will be given of examples of the disclosure with reference to attached drawings An image forming apparatus may refer to an apparatus capable of performing an image forming job, such as a printer, a copier, a scanner, a multi-function printer, and a fax machine. An image forming job may refer to any of various jobs related to an image, for example, printing, copying, scanning, faxing, or a function related thereto, and may include a series of processes for performing the image forming job.

A host device may refer to a device capable of transmitting content, which is a target of an image forming job, to an image forming apparatus, and may be a personal computer (PC), a smart phone, a tablet, a laptop computer, or the like. A user may execute an application installed in the host device to perform a document job, execute a printing function provided by the application, and transmit a document to be printed to the image forming apparatus.

A cartridge may refer to a container to contain toner or ink used by the image forming apparatus to print. In order for a user to easily replace the toner or ink, the cartridge may be manufactured as a detachable part of the image forming apparatus.

Remaining amount information of toner or ink may refer to information about an amount of toner or ink contained in a cartridge. The image forming apparatus may obtain information about the remaining amount of toner or ink by using a sensor. In an example, the sensor may be located inside the cartridge.

Cartridge status information may refer to information indicating a status related to an output of the cartridge. For example, the cartridge status information may include information about whether a printout may be output with a target print quality. As an example, the cartridge status information may include information about a remaining amount of toner or ink included in the cartridge. For another example, the cartridge status information may include information regarding the need to replace the cartridge. As an example, the cartridge status information may include information about a replacement cycle of the cartridge. For another example, the cartridge status information may include information about a trouble (e.g., an error) that has occurred with the cartridge.

Print data may refer to a printing command that depicts an image generated by a host device using a standard function in response to a print request from a user. The print data may also be referred to as a print job. The print data may include page description language (PDL) data in which the host device encodes a printing command in a description language. The print data may include a printer job language (PJL) related to a setting of an image forming apparatus. The print data may include pixel information (e.g., information indicating whether a pixel corresponds to an image, graphic, text, etc.) of an image. The print data may be transmitted from the host device to the image forming apparatus. The image forming apparatus may generate image information by performing rendering using the print data.

A printout image may refer to an image obtained by an image forming apparatus by scanning a printout that is output from the image forming apparatus. For example, the printout image may be generated by being scanned by a scanner attached to the image forming apparatus or by a scanning module connected to the image forming apparatus to scan the printout that is output from the image forming apparatus.

Dithered data may refer to image data obtained by performing dithering on an image. For example, the image forming apparatus may dither rendered image data obtained from the print data, so that dithered data may be obtained. In addition, dithered data may be obtained by the image forming apparatus by performing dithering on the printout image.

The quality of a printout is a concept that indicates whether the printout contains a number of dots or pixels that matches a print setting. Whether the quality of the printout is high or low may be detected based on the number of dots or pixels included in the printout compared to the number of dots or pixels included in the print data. The image forming apparatus may identify whether the quality of the printout satisfies a criterion from a result of comparing a print quality value with a threshold value.

The print quality value may refer to a ratio of a number of pixels included in a first area of print data to a number of pixels included in a second area of the print data. In this case, the second area may be an area corresponding to the first area.

The threshold value may refer to an allowable lower limit value of the print quality value. The threshold value may be set by a manufacturer or a user.

A print setting of the image forming apparatus may refer to a criterion and an operation for the image forming apparatus to print a printout to process a request from the host device. For example, the print setting of the image forming apparatus may include a reference value of a quality of a printout that is output from the image forming apparatus. The print setting of the image forming apparatus may include a definition of an operation based on the quality of the printout not reaching a set reference value. The print setting of the image forming apparatus may include information about a period for identifying the quality of the printout.

FIG. 1 illustrates an image forming apparatus that is to obtain cartridge status information based on a result of scanning a printout according to an example.

Referring to FIG. 1, an image forming apparatus 10 may transmit/receive data to/from a host device 20a, a host device 20b, and/or a host device 20c (hereinafter "host device 20" for convenience).

The image forming apparatus 10 may receive print data for outputting an image from the host device 20. The print data may include page description language (PDL) data, printer job language (PJL) data, and pixel information of an image.

The image forming apparatus 10 may receive data for controlling a print setting of the image forming apparatus from the host device 20. For example, the image forming apparatus 10 may receive control data for adjusting a print quality from the host device 20. The image forming apparatus 10 may receive from the host device 20 control data defining an operation based on the quality of a printout not satisfying a criterion. The image forming apparatus 10 may receive control data for adjusting a period for identifying the quality of a printout from the host device 20. The image forming apparatus 10 may receive the PJL data as control data from the host device 20.

The image forming apparatus 10 may output a printout using the print data. The image forming apparatus 10 may print content by using the PDL data included in the print data.

The image forming apparatus 10 may obtain a printout image by scanning the printout using a scanning module 11. The image forming apparatus 10 may identify the quality of the printout by using the printout image.

The image forming apparatus 10 may include the scanning module 11.

The scanning module 11 may be located in a portion of the image forming apparatus 10. For example, the scanning module 11 may be a flat-panel scanner located on the image forming apparatus 10. For another example, the scanning module 11 may be arranged downstream of a print module of the image forming apparatus. As an example, the scanning module 11 may be an inline scanner located in an upstream direction of a paper discharger from which a printout is discharged downstream of the print module.

The scanning module 11 may be a separate device from the image forming apparatus 10. The scanning module 11 may have a detachable structure to be coupled to the image forming apparatus 10. The scanning module 11 may transmit/receive data to/from the image forming apparatus 10 through a wired/wireless communication interface.

The image forming apparatus 10 may obtain cartridge status information based on the quality of the printout and remaining amount information regarding the remaining amount of toner or ink in a cartridge of the image forming apparatus 10. For example, the image forming apparatus 10 may obtain cartridge status information indicating that the cartridge needs to be replaced. For another example, the image forming apparatus 10 may obtain status information regarding a trouble (e.g., an error) that has occurred in the cartridge.

The image forming apparatus 10 may output the cartridge status information. For example, the image forming apparatus 10 may display the cartridge status information on a display. For another example, the image forming apparatus 10 may transmit the cartridge status information to the host device 20 so that the host device 20 may display the cartridge status information. For another example, the image forming apparatus 10 may transmit the cartridge status information to an external server 30.

The image forming apparatus 10 may change a print setting based on the cartridge status information. For example, the image forming apparatus 10 may change the print setting to output a printout in a single color based on cartridge status information indicating that toner or ink of at least one color from among different colors is insufficient. For another example, the image forming apparatus 10 may change the print setting to output a printout using toner or ink of a different color based on the cartridge status information indicating that black toner or ink is insufficient.

The image forming apparatus 10 may transmit/receive data to/from the external server 30. The image forming apparatus 10 may receive print data for outputting an image from the external server 30 and data for controlling a print setting of the image forming apparatus, such as data received from the host device 20.

The image forming apparatus 10 may transmit/receive data to/from the external server 30 based on cartridge status information indicating that the cartridge needs to be replaced. For example, based on cartridge status information that the cartridge needs to be replaced due to an insufficient remaining amount of toner or ink, the image forming apparatus 10 may transmit/receive data (e.g., a cartridge product number, a user's credit card number, a user's address, contact information, etc.) for obtaining (e.g., purchasing, etc.) a cartridge with the external server 30 that provides (e.g., sells, etc.) cartridges.

The image forming apparatus 10 may transmit an error code to the external server 30 as the cartridge status information indicating that a trouble has occurred in the cartridge to address the trouble occurring in the cartridge. The image forming apparatus 10 may transmit a printout image and information about the remaining amount of toner or ink to the external server 30 to address the trouble occurring in the cartridge. The image forming apparatus 10 may receive information about a method of addressing the trouble occurring in the cartridge (e.g., nozzle cleaning guide, control signal, etc.) from the external server 30.

Figure 2:
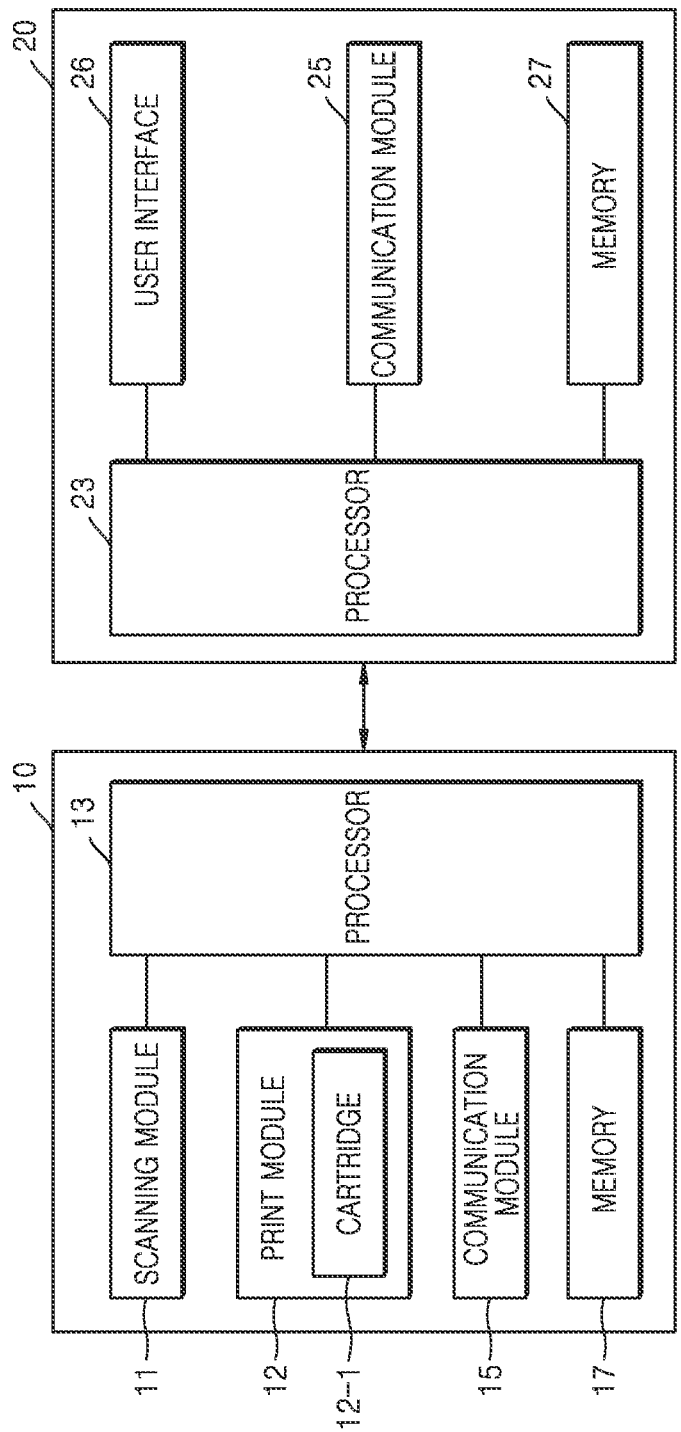
FIG. 2 is a block diagram illustrating a host device and an image forming apparatus according to an example.

FIG. 2 is a block diagram illustrating a host device and an image forming apparatus according to an example.

Referring to FIG. 2, the image forming apparatus 10 and the host device 20 may transmit/receive data.

The image forming apparatus 10 may include the scanning module 11, a print module 12, a communication module 15, a memory 17, and a processor 13. However, the image forming apparatus 10 may include more or fewer elements than the elements of the image forming apparatus 10 shown in FIG. 2. For example, the image forming apparatus 10 may further include a user interface (not shown) through which a user may receive an input to control the image forming apparatus 10. For another example, the image forming apparatus 10 may further include a display (not shown) to output information about the image forming apparatus.

The scanning module 11 may scan an image recorded in a document by irradiating light onto a document and receiving light reflected by the document.

The print module 12 may form and output an image on a printout through various printing methods such as an electrophotographic method, an inkjet method, and the like. The print module 12 may include a cartridge 12-1 containing toner or ink with which to form an image on a printout.

The communication module 15 may transmit/receive data to/from an external device or a network such as the host device 20 and the external server 30. For example, the communication module 15 may receive print data from an external device. The communication module 15 may perform wired communication based on a standard such as Ethernet, Universal Serial Bus (USB), High Definition Multimedia Interface (HDMI), and the like. The communication module 15 may perform wireless communication based on a standard such as Wireless Fidelity (Wi-Fi), Wi-Fi Direct, Bluetooth, Ultra Wide Band (UWB), Near Field Communication (NFC), and the like. The communication module 15 may perform a fax function by transmitting a printout image obtained by the scanning module 11 to an external fax machine or by receiving print data from an external fax machine to be output by the print module 12.

The memory 17 may store various types of data such as a program and files such as an application. The memory 17 may store at least one instruction and at least one program for processing and controlling the processor 13. The memory 17 may store information about a state of the image forming apparatus 10.

The memory 17 may include at least one type of storage medium from among a memory that temporarily stores data, such as Random Access Memory (RAM), static RAM (SRAM), and the like, and data storage that non-temporarily stores data, such as a flash memory type, Read-Only Memory (ROM), and the like. The memory 17 may be composed of at least one memory chip.

The processor 13 may include at least one processing unit such as a central processing unit (CPU) or the like. In addition, the processor 13 may include at least one specialized processing unit corresponding to each function.

The processor 13, by executing at least one instruction stored in the memory 17, may generally control the scanning module 11, the print module 12, the communication module 15, the memory 17, and the like to provide examples described with reference to FIGS. 3 to 11 below.

The processor 13 may access and use data stored in the memory 17 or store new data in the memory 17. The processor 13 may execute a program installed in the memory 17. The processor 13 may store a file or a program received from an external source through the communication module 15 in the memory 17.

The host device 20 may include a user interface 26, a communication module 25, a memory 27, and a processor 23. However, the host device 20 may include more or fewer elements than the elements of the host device 20 shown in FIG. 2.

The user interface 26 may include an input device to receive input from a user, etc. and an output device to display a document to be printed. For example, the user interface 26 may be a combination of an output device such as a monitor and an input device such as a keyboard, a touch pad, a mouse, and the like or may include a touch screen.

The communication module 25 is to allow the host device 20 to transmit and receive data to and from an external device or network, such as the image forming apparatus 10, an external server, and the like. For example, the communication module 25 may transmit print data to the image forming apparatus 10. The communication module 25 may perform wired communication based on a standard such as Ethernet, USB, HDMI, and the like. The communication module 25 may perform wireless communication based on a standard such as Wi-Fi, Wi-Fi Direct, Bluetooth, UWB, NFC, and the like.

The memory 27 may store various types of data such as a program, a file such as an operating system (OS), an application, and the like. The memory 27 may store at least one instruction and at least one program for processing and controlling the processor 23.

The memory 27 may include at least one type of storage medium from among a memory that temporarily stores data, such as RAM, SRAM, etc. and data storage that non-temporarily stores data, such as a flash memory type, ROM, etc.

The processor 23 may include at least one processing unit such as a CPU or the like. In addition, the processor 23 may include at least one specialized processing unit corresponding to each function or a single processing unit corresponding to all functions.

The processor 23, by executing at least one instruction stored in the memory 27, may generally control the user interface 26, the communication module 25, the memory 27, and the like to provide examples described with reference to FIGS. 3 to 11 below.

The processor 23 may generate print data that may be used by the image forming apparatus 10 to perform an image forming job. For example, the processor 23 may execute instructions stored in the memory 27 to generate a page description file of a document to be printed according to a print request through an application.

Figure 3:
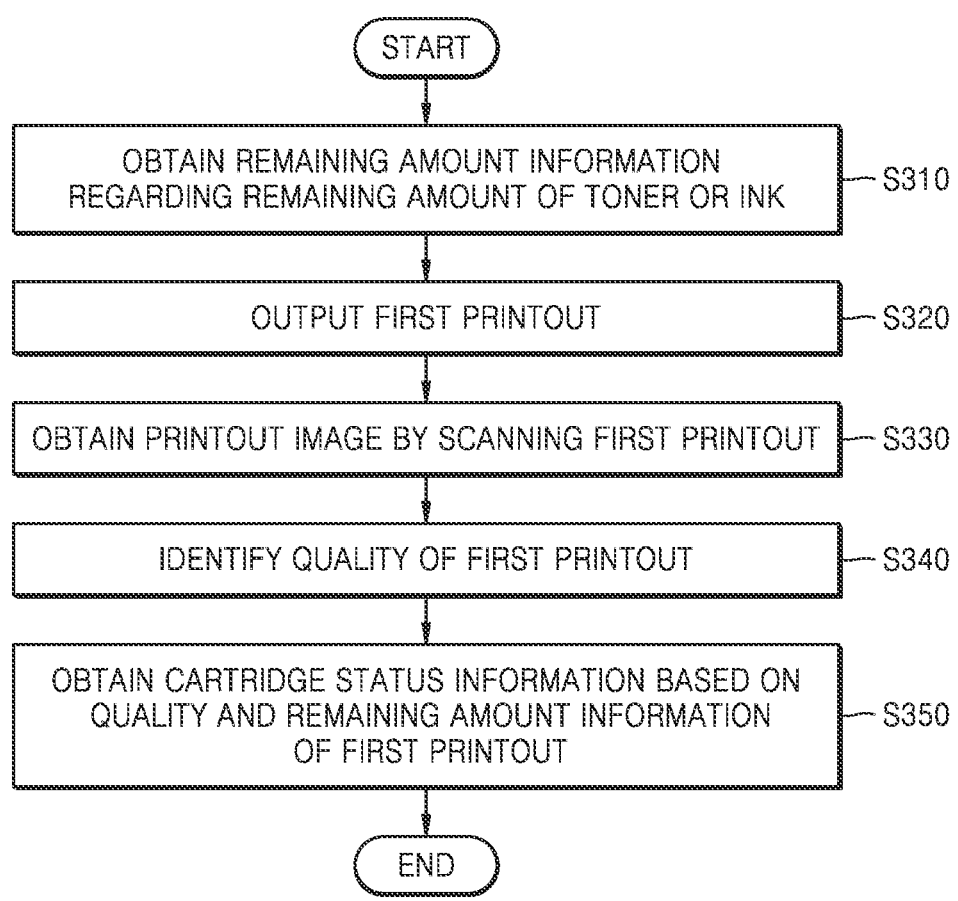
FIG. 3 is a flowchart illustrating a method for an image forming apparatus to obtain cartridge status information according to an example.

FIG. 3 is a flowchart illustrating a method for an image forming apparatus to obtain cartridge status information according to an example. Each operation of FIG. 3 may be implemented by instructions executable by a processor. In addition, the instructions may be stored in a non-transitory storage medium readable by a computer including a processor.

Referring to operation S310, the image forming apparatus may obtain remaining amount information regarding a remaining amount of toner or ink. For example, the image forming apparatus may obtain information about the remaining amount of toner or ink contained in a cartridge from a sensor located inside of the cartridge. The image forming apparatus may store the remaining amount information in a memory.

Referring to operation S320, the image forming apparatus may output a first printout.

The image forming apparatus may output the first printout by using print data received from a host device. For example, the image forming apparatus may obtain a rendered image by rendering PDL data included in the print data. The image forming apparatus may obtain a dithered image by performing dithering on the rendered image. The image forming apparatus may output the dithered image as the first printout based on set data (e.g., PJL data) and pixel information included in the print data received from the host device.

The image forming apparatus may output the first printout by using print data generated from data stored in an external device (e.g., a USB memory) connected to the image forming apparatus. For example, the image forming apparatus may generate print data using a document, an image, pattern data, or the like stored in an external device. The image forming apparatus may output the first printout by using the generated print data.

The image forming apparatus may output the first printout by using print data stored in the memory of the image forming apparatus. For example, the image forming apparatus may output the first printout by using print data related to a document, an image, pattern data, or the like stored in advance in the memory at the time of shipment from the factory (e.g., by a manufacturer).

Referring to operation S330, the image forming apparatus may obtain a printout image by scanning the first printout.

The image forming apparatus may obtain the printout image by scanning the first printout that is output from the image forming apparatus using a scanning module.

The image forming apparatus may scan the first printout using the scanning module attached to the image forming apparatus. For example, the first printout may be scanned using a flat panel scanning module located on an upper portion of the image forming apparatus. For another example, the image forming apparatus may scan the first printout by using an inline scanning module located near a paper discharging module of the image forming apparatus. The scanning module may be a detachable device that can be attached to the image forming apparatus.

The image forming apparatus may receive a printout image obtained by scanning the first printout by a separate scanning device connected to the image forming apparatus by wire or wirelessly.

Referring to operation S340, the image forming apparatus may identify the quality of the first printout.

The image forming apparatus may identify the quality of the first printout by comparing the print data received from the host device with the printout image obtained by scanning the first printout.

For example, the image forming apparatus may identify the quality of the first printout by comparing first dithered data obtained from the print data with second dithered data obtained from the printout image. The image forming apparatus may identify the quality of the first printout by a result of comparing the number of dots or pixels in a second area included in the second dithered data with the number of dots or pixels in a first area included in the first dithered data.

The image forming apparatus may identify whether the quality of the first printout satisfies a criterion by comparing a print quality value, which is a ratio of the number of pixels included in the first dithered data to the number of pixels included in the second dithered data, with a threshold value.

The threshold value may be set by a user. An example in which a user sets a threshold value will be described below with reference to FIG. 9.

Operation S340 will be described in more detail below with reference to FIG. 4.

Referring to operation S350, the image forming apparatus may obtain cartridge status information based on the quality and remaining amount information of the first printout.

For example, the image forming apparatus may obtain cartridge status information indicating that the cartridge is normal based on a result of identifying that the quality of the first printout identified in operation S340 satisfies a criterion and that the remaining amount of toner or ink is sufficient from the remaining amount information obtained in operation S310. As an example, the image forming apparatus may obtain cartridge status information indicating that the cartridge is normal based on a result of identifying from the remaining amount information that the remaining amount of toner or ink is 10% or more and the print quality value is greater than or equal to a threshold value.

For another example, the image forming apparatus may obtain cartridge status information indicating that a replacement time of the cartridge is imminent based on a result of identifying that the quality of the first printout identified in operation S340 satisfies a criterion and that the remaining amount of toner or ink is insufficient from the remaining amount information obtained in operation S310. As an example, the image forming apparatus may obtain cartridge status information indicating that a replacement time of the cartridge is imminent based on a result of identifying from the remaining amount information that the remaining amount of toner or ink is less than 10% and the print quality value is greater than or equal to the threshold value.

For another example, the image forming apparatus may obtain cartridge status information indicating that the cartridge needs to be replaced based on a result of identifying that the quality of the first printout identified in operation S340 does not satisfy a criterion and that the remaining amount of toner or ink is insufficient from the remaining amount information obtained in operation S310. As an example, the image forming apparatus may obtain cartridge status information indicating that the cartridge needs to be replaced based on a result of identifying from the remaining amount information that the remaining amount of toner or ink is less than 10% and the print quality value is below the threshold value.

For another example, the image forming apparatus may obtain cartridge status information indicating that a trouble (e.g., nozzle clogging, toner hardening, etc.) has occurred in the cartridge based on a result of identifying that the quality of the first printout identified in operation S340 does not satisfy a criterion and that the remaining amount of toner or ink is sufficient from the remaining amount information obtained in operation S310. As an example, the image forming apparatus may obtain cartridge status information indicating that the trouble has occurred in the cartridge based on a result of identifying from the remaining amount information that the remaining amount of toner or ink is 10% or more and the print quality value is below the threshold value.

The image forming apparatus may output the cartridge status information.

The image forming apparatus may display the cartridge status information on a display. For example, the image forming apparatus may display cartridge status information that the cartridge is in a normal state, cartridge status information that a replacement time is imminent, cartridge status information that the cartridge needs to be replaced, and cartridge status information indicating that a trouble has occurred in the cartridge on the display.

The image forming apparatus may transmit the cartridge status information to the host device so that the host device may display the cartridge status information.

The image forming apparatus may transmit the cartridge status information to an external server. For example, the image forming apparatus may transmit cartridge status information indicating that a cartridge replacement time is imminent or cartridge status information indicating that the cartridge needs to be replaced to an external server (e.g., a server related to a shopping service that sells cartridges). For another example, the image forming apparatus may transmit cartridge status information indicating that the trouble has occurred in the cartridge to an external server (e.g., a server related to a manufacturer's customer support).

In an example, the image forming apparatus may change a print setting based on the cartridge status information. For example, the image forming apparatus 10 may change the print setting to output a printout in a single color based on cartridge status information indicating that toner or ink of at least one color from among different colors is insufficient. For another example, the image forming apparatus 10 may change the print setting to output a printout using toner or ink of a different color based on the cartridge status information indicating that black toner or ink is insufficient. The image forming apparatus may output information indicating that the print setting has been changed. An example in which the image forming apparatus changes the print setting based on the cartridge status information will be described below with reference to FIG. 10.

In various examples, the image forming apparatus may perform a method of obtaining cartridge status information including steps S310 to S350 at certain periods. The certain periods may be preset by a manufacturer, or may be set by a user. An example in which a user sets certain periods will be described in detail below with reference to FIG. 11.

Figure 4:
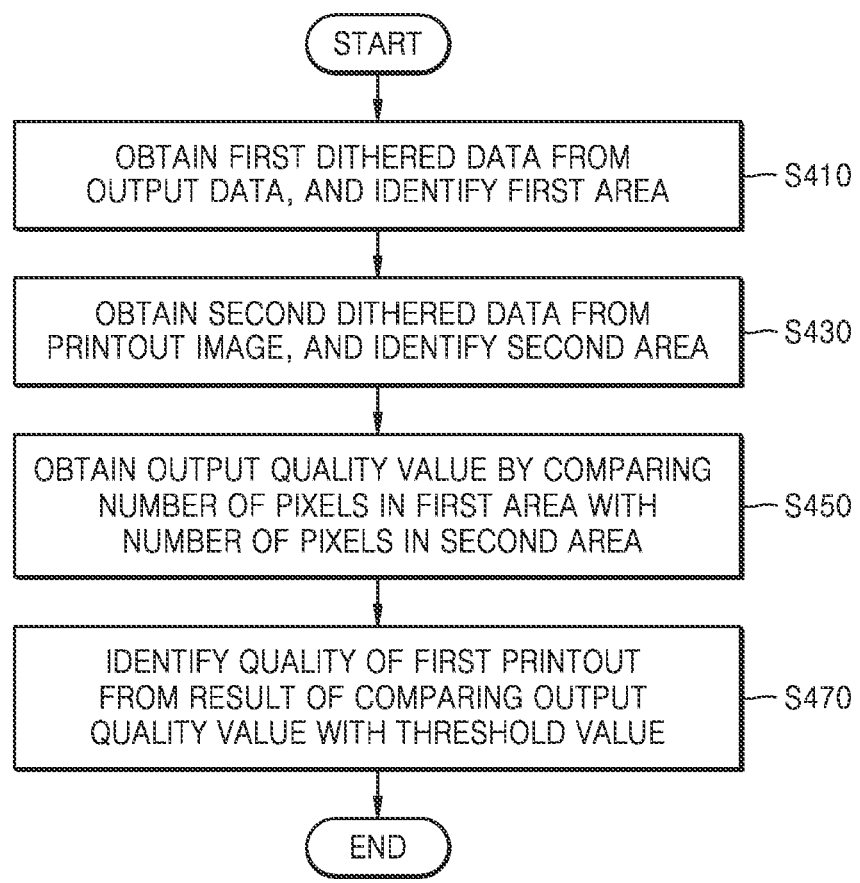
FIG. 4 is a flowchart illustrating a method for an image forming apparatus to identify a quality of a printout according to an example.

FIG. 4 is a flowchart illustrating a method for an image forming apparatus to identify a quality of a printout according to an example.

Referring to operation S410, the image forming apparatus may obtain first dithered data from print data, and identify a first area in the first dithered data.

For example, the image forming apparatus may obtain rendered image data by rendering page description file (PDF) data included in the print data. The image forming apparatus may obtain the first dithered data by performing dithering on the rendered image data. The image forming apparatus may identify a certain area in the first dithered data as the first area. The first area may be an area in which the number of pixels constituting an image is equal to or greater than a certain value. The first area may be an area in which the number of pixels of each of cyan, magenta, yellow, and black is equal to or greater than a certain value.

Referring to operation S430, the image forming apparatus may obtain second dithered data from a printout image, and identify a second area in the second dithered data.

For example, the image forming apparatus may obtain the second dithered data by performing dithering on a printout image including data of red, green, and blue colors. The image forming apparatus may identify an area in the second dithered data corresponding to the first area as the second area.

Referring to operation S450, the image forming apparatus may obtain a print quality value of a first printout by comparing the number of pixels in the first area with the number of pixels in the second area.

For example, the image forming apparatus may obtain a print quality value of the first printout that is a ratio of the number of pixels included in the first area to the number of pixels included in the second area by comparing the number of pixels of each color included in the first region with the number of pixels of each color included in the second region. The image forming apparatus may identify a print quality value of each of colors (e.g., cyan, magenta, yellow, and black) constituting an image.

Referring to operation S470, the image forming apparatus may identify the quality of the first printout from a result of comparing the print quality value with a threshold value.

For example, the image forming apparatus may compare the print quality value obtained in operation S450 with a threshold value included in a PJL of the print data. The threshold value may be set for each of colors (e.g., cyan, magenta, yellow, and black) constituting an image. The threshold value may be preset by a manufacturer, or may be set by a user. An example in which a threshold value is set by a user will be described below with reference to FIG. 9.

The image forming apparatus may identify whether the quality of the first printout satisfies a criterion by comparing the print quality value with the threshold value. For example, the image forming apparatus may identify that the quality of the first printout satisfies a criterion based on the print quality value of the first printout being equal to or greater than the threshold value. The image forming apparatus may identify that the quality of the first printout does not satisfy a criterion based on at least one of print quality values of colors constituting an image being less than the threshold value.

The image forming apparatus may perform operation S350 based on the identified quality of the first printout.

Figure 5:
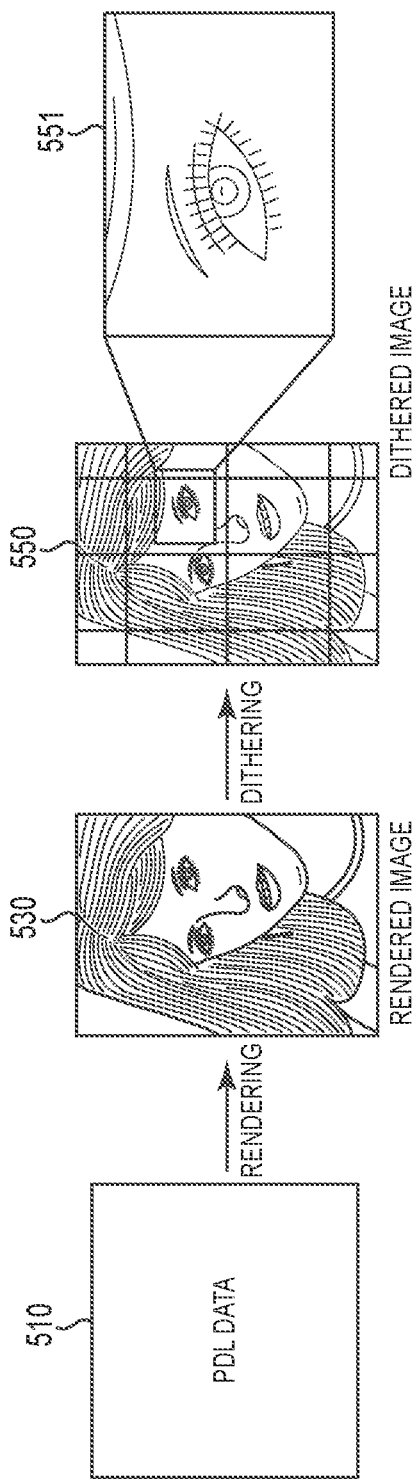
FIG. 5 is a view illustrating a process in which an image forming apparatus obtains dithered data from print data received from a host device according to an example.

FIG. 5 is a view illustrating a process in which an image forming apparatus obtains dithered data from print data received from a host device according to an example.

Referring to FIG. 5, the image forming apparatus may identify PDL data 510 from print data received from the host device.

The image forming apparatus may obtain a rendered image 530 using the PDL data 510. The rendered image 530 may be a color image composed of red, green, and blue colors. For example, the image forming apparatus may obtain the rendered image 530 in a bitmap format by performing rendering using the PDL data 510.

The image forming apparatus may obtain a dithered image 550 by performing dithering on the rendered image 530. The dithered image 550 may be a color image composed of cyan, magenta, yellow, and black colors. The image forming apparatus may perform dithering based on set data and pixel information included in the print data. For example, the image forming apparatus may obtain the dithered image 550 composed of cyan, magenta, yellow, and black colors by performing dithering according to a resolution setting included in the print data on the rendered image 530 in a bitmap format composed of red, green, and blue colors using a dithering table.

The image forming apparatus may identify a first area 551 in the dithered image 550. The first area 551 may be an area in which the number of pixels constituting an image is equal to or greater than a certain value. The image forming apparatus may identify an area in which the number of pixels of cyan, magenta, yellow, and black is equal to or greater than a certain value as the first area 551.

Figure 6:
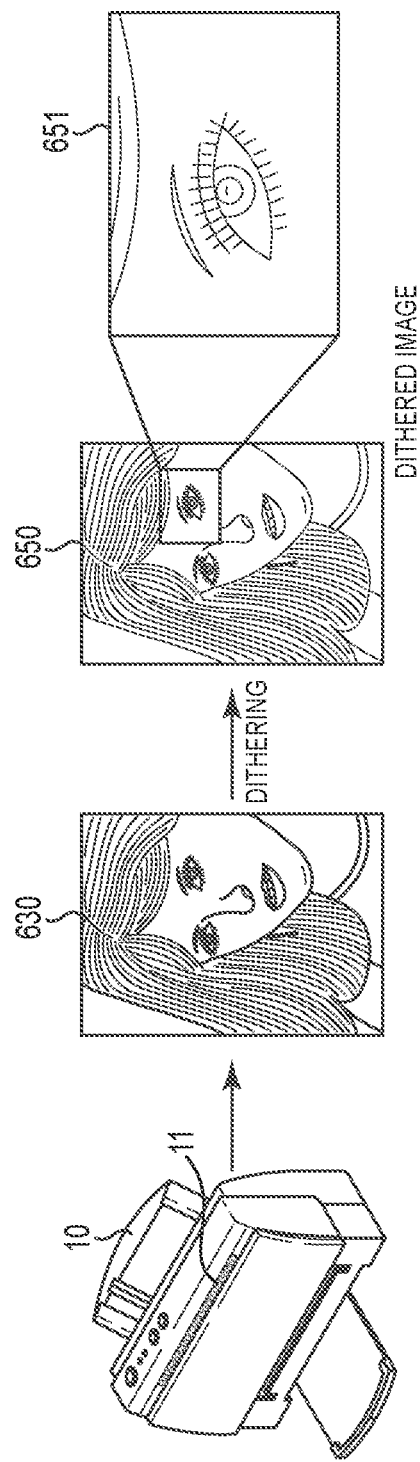
FIG. 6 is a view illustrating a process in which an image forming apparatus scans a printout to obtain dithered data according to an example.

FIG. 6 is a view illustrating a process in which an image forming apparatus scans a printout to obtain dithered data according to an example.

Referring to FIG. 6, the image forming apparatus 10 may scan a printout that is output from the image forming apparatus 10. The printout may be a normal output in which all colors are normally output. Alternatively, the printout may be an abnormal printout in which at least one color (e.g., at least one color from among cyan, magenta, yellow, and black) is insufficiently output.

The image forming apparatus 10 may obtain a printout image 630 by scanning the printout that is output from the image forming apparatus 10 using the scanning module 11. For example, the image forming apparatus 10 may scan the printout by using a flat-panel scanner located on the image forming apparatus 10. For another example, the image forming apparatus 10 may scan the printout by using an inline scanner located in an upstream direction of a paper discharger from which a printout is discharged downstream of a print module.

The printout image 630 may be a color image in a bitmap format composed of red, green, and blue colors. For example, the printout image 630 may be a color image in a bitmap format composed of red, green, and blue colors generated by scanning a printout that is output with insufficient magenta color.

The image forming apparatus 10 may obtain a dithered image 650 by performing dithering on the printout image 630. The dithered image 650 may be a color image composed of cyan, magenta, yellow, and black colors. For example, the image forming apparatus may obtain the dithered image 650 composed of cyan, magenta, yellow, and black colors on the printout image 630 in a bitmap format composed of red, green, and blue colors. The dithered image 650 may be an image generated based on a printout that is output with insufficient magenta color. Accordingly, the dithered image 650 may be a color image having few pixels of the magenta color.

The image forming apparatus 10 may identify a second area 651 in the dithered image 650. The second area 651 may correspond to the first area 551 (of FIG. 5).

Figure 7:
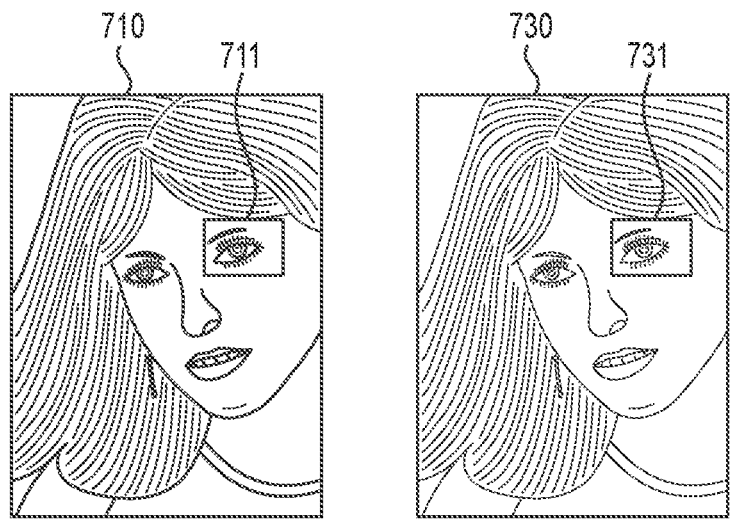
FIG. 7 is a view illustrating a process in which an image forming apparatus identifies a quality of a printout by comparing dithered data obtained from print data with dithered data obtained from the printout according to an example.

FIG. 7 is a view illustrating a process in which an image forming apparatus identifies a quality of a printout by comparing dithered data obtained from print data with dithered data obtained from the printout according to an example.

Referring to FIG. 7, the image forming apparatus may compare first dithered data 710 obtained from the print data with second dithered data 730 obtained from the printout that is output from the image forming apparatus. For example, the image forming apparatus may compare the first dithered data 710 with the second dithered data 730 obtained from a printout that is output with insufficient magenta color.

The image forming apparatus may identify the number of pixels included in each of the first dithered data 710 and the second dithered data 730. The image forming apparatus may identify the number of pixels of each of colors (e.g., cyan, magenta, yellow, and black) constituting images of the first dithered data 710 and the second dithered data 730.

The image forming apparatus may obtain a print quality value of a first printout by comparing a number of pixels of the first dithered data 710 and a number of pixels of the second dithered data 730. The print quality value may be defined as in Equation 1.

$$\text{Print quality value (\%)} = \qquad \text{Equation 1}$$
$$(\text{number of pixels included in second dithered data}/$$
$$\text{number of pixels included in first dithered data}) * 100$$

The image forming apparatus may identify a print quality value of each of colors (e.g., cyan, magenta, yellow, and black) constituting an image.

$$\text{Print quality value of cyan color (\%)} = \qquad \text{Equation 2}$$
$$(\text{number of pixels of cyan color included}$$
$$\text{in second dithered data/number of pixels of}$$
$$\text{cyan color included in first dithered data}) * 100$$

The image forming apparatus may identify print quality values of magenta, yellow, and black colors similarly to Equation 2.

The image forming apparatus may compare a first area 711 identified from the first dithered data 710 with a second area 731 identified from the second dithered data 730 to reduce the amount of computation. The second area 731 corresponds to the first area 711. For example, the image forming apparatus may identify the number of pixels of each of colors (e.g., cyan, magenta, yellow, and black) included in each of the first area 711 and the second area 731.

The image forming apparatus may obtain a print quality value of a printout that is a ratio of the number of pixels included in the first area 711 to the number of pixels included in the second area 731 by comparing the number of pixels included in the first area 711 with the number of pixels included in the second area 731. That is, the print quality value may be defined as in Equation 3.

$$\text{Print quality value (\%)} = \qquad \text{Equation 3}$$
$$(\text{number of pixels included in second}$$
$$\text{area/number of pixels included in first area}) * 100$$

The image forming apparatus may obtain a print quality value of each of colors (e.g., cyan, magenta, yellow, and black) of a printout by comparing the number of pixels of each of the colors included in the first area 711 with the number of pixels of each of the colors included in the second area 731.

The image forming apparatus may identify whether the quality of the printout satisfies a criterion by comparing the print quality value with a threshold value. The image forming apparatus may identify that the quality of the printout satisfies a criterion based on the print quality value of the printout being equal to or greater than the threshold value. The image forming apparatus may identify that the quality of the printout does not satisfy a criterion based on at least one of print quality values of colors constituting an image being less than the threshold value. For example, the image forming apparatus may identify that the quality of the printout does not satisfy a criterion based on a print quality value of magenta color being less than the threshold value.

Figure 8:
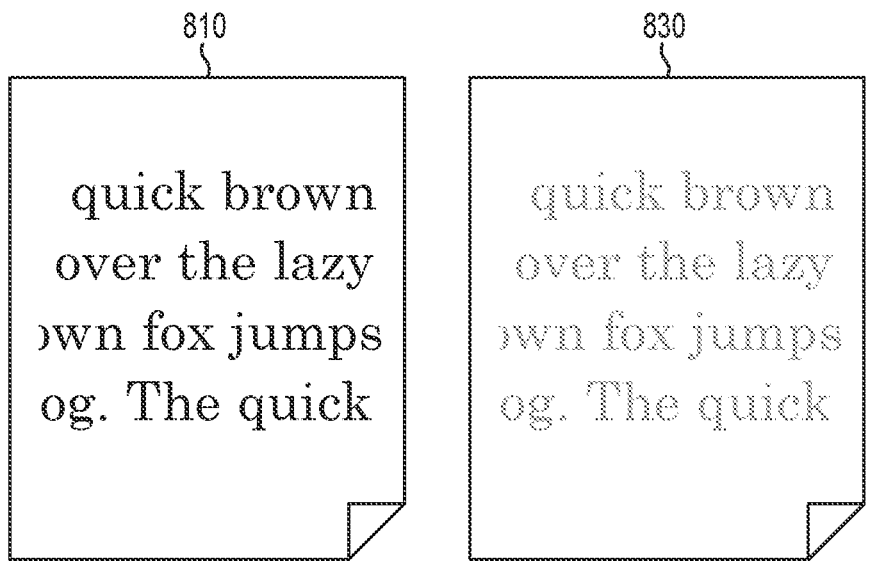
FIG. 8 is a view illustrating a process in which an image forming apparatus identifies a quality of a printout by comparing dithered data obtained from print data with dithered data obtained from the printout according to an example.

FIG. 8 is a view illustrating a process in which an image forming apparatus identifies a quality of a printout by comparing dithered data obtained from print data with dithered data obtained from the printout according to an example.

Referring to FIG. 8, the image forming apparatus may compare first dithered data 810 obtained from the print data with second dithered data 830 obtained from the printout that is output from the image forming apparatus. For example, the image forming apparatus may compare the first dithered data 810 with the second dithered data 830 obtained from a printout that is output with insufficient magenta color.

The image forming apparatus may identify the number of pixels included in each of the first dithered data 810 and the second dithered data 830. The image forming apparatus may obtain a print quality value of each of colors (e.g., cyan, magenta, yellow, and black) of a printout by comparing the number of pixels of each of colors included in the first dithered data 810 with the number of pixels of each of colors included in the second dithered data 830.

The image forming apparatus may identify whether the quality of the printout satisfies a criterion by comparing the print quality value with a threshold value. The image forming apparatus may identify that the quality of the printout satisfies a criterion based on the print quality value of the printout being equal to or greater than the threshold value. The image forming apparatus may identify that the quality of the printout does not satisfy a criterion based on at least one of print quality values of colors constituting an image being less than the threshold value. For example, the image forming apparatus may identify that the quality of the printout does not satisfy a criterion based on a print quality value of magenta color being less than the threshold value.

FIG. 9 is a view illustrating a method for an image forming apparatus to set a threshold value for evaluating a quality of a printout according to an example.

Referring to FIG. 9, a host device or an image forming apparatus may receive a user input for setting a threshold value for evaluating a quality of a printout.

The host device or the image forming apparatus may provide a user with a user interface to receive the user input for setting a threshold value. For example, the host device or the image forming device may display a window 900 for setting a threshold value on a display. The host device or the image forming apparatus may receive a user input for setting a threshold value through the user interface that is to receive a user input such as a touch screen or a keypad.

The host device or the image forming apparatus may receive a user input to set respective threshold values of colors constituting an image. For example, the host device or the image forming device may receive a user input to set respective threshold values of cyan, magenta, yellow, and black.

The host device may transmit a threshold value set based on a user input to the image forming apparatus. For example, the host device may transmit a PJL including a threshold value to the image forming apparatus. The image forming apparatus may store the transmitted threshold value in a memory.

The image forming apparatus may identify the quality of a printout based on the set threshold value. The image forming apparatus may obtain cartridge status information based on the quality of the printout identified based on the threshold and the remaining amount of toner or ink.

Figure 10:
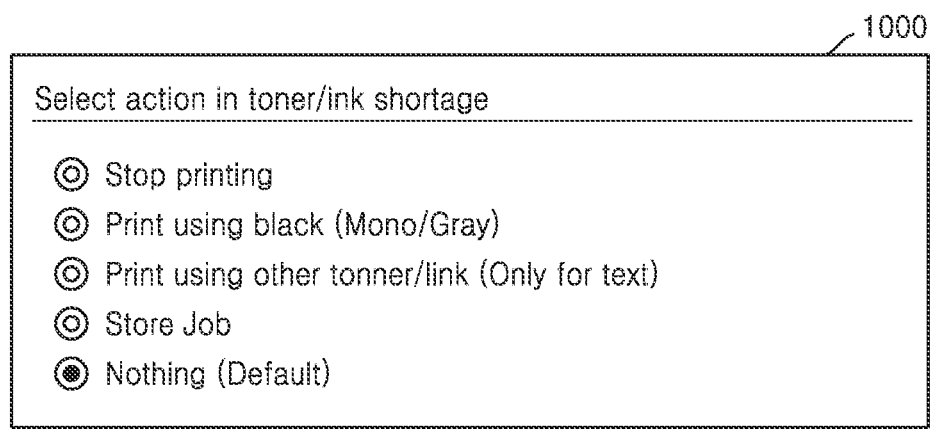
FIG. 10 is a view illustrating an operation to be performed by an image forming apparatus in a situation in which a quality of a printout is deteriorated according to an example.

FIG. 10 is a view illustrating an operation to be performed by an image forming apparatus in a situation in which a quality of a printout is deteriorated according to an example.

Referring to FIG. 10, in a situation in which a quality of a printout does not satisfy a criterion, an operation to be performed by the image forming apparatus may be defined based on cartridge status information indicating that the cartridge needs to be replaced. For example, an operation to be performed by the image forming apparatus may be defined as Stop printing, Print using black, Print using other toner, Store Job, and Nothing.

Stop printing may refer to an operation in which the image forming apparatus cancels an output job and deletes print data input to the image forming apparatus.

Print using black may refer to an operation in which the image forming apparatus outputs a black-and-white or gray level image using black toner or ink and not using another color of toner or ink.

Print using other toner may refer to an operation in which the image forming apparatus outputs using a color of toner or ink of which an amount currently remaining is highest. Print using other toner may be performed in a situation in which all of print data received by the image forming apparatus is text.

Store job may refer to an operation in which the image forming apparatus stores print data in a memory without outputting print data to be output after the cartridge is replaced.

Nothing may refer to an operation in which the image forming apparatus continues to perform a print operation.

An operation to be performed by the image forming apparatus may be defined by a user. The host device or the image forming apparatus may receive a user input for setting an operation to be performed by the image forming apparatus.

The host device or the image forming apparatus may provide a user with a user interface to receive a user input for setting an operation to be performed by the image forming apparatus. For example, the host device or the image forming apparatus may display a window 1000 for setting an operation to be performed by the image forming apparatus on a display. The host device or the image forming apparatus may receive a user input for setting an operation to be performed by the image forming apparatus through a user interface that is to receive a user input such as a touch screen or a keypad.

The host device may transmit an operation to be performed by the image forming apparatus set based on a user input to the image forming apparatus. The host device may transmit a PJL including control information regarding an operation to be performed by the image forming apparatus to the image forming apparatus. For example, the host device may transmit control information such as @PJL SET JOBATTR="DOINKSHORTAGE=STOPPRINT", @PJL SET JOBATTR="DOINKSHORTAGE= PRINTWITHBLACK", @PJL SET JOBATTR= "DOINKSHORTAGE=PRINTWITHOTHERFORTEXT", @PJL SET JOBATTR="DOINKSHORTAGE= STOREJOB", and @PJL SET JOBATTR="DOINKSHORTAGE=NOTHING" to the image forming apparatus. The image forming apparatus may store the transmitted control information in a memory.

The image forming apparatus may perform a set operation based on the control information received from the host device. In the image forming apparatus, based on the quality of the printout not satisfying a criterion, a setting regarding an operation to be performed may be applied in preference to other print settings. For example, the image forming apparatus, based on cartridge status information that a magenta color cartridge needs to be replaced, may perform printing by applying a setting related to an operation of Print using black rather than a setting for outputting an image using all toners or inks. For another example, the image forming apparatus may perform printing by applying a setting related to an operation of Print using other toner rather than a setting for outputting a document using black toner or ink based on cartridge status information that a black color cartridge needs to be replaced.

The image forming apparatus may output information indicating that the print setting has been changed. For example, the image forming apparatus may output information indicating that the setting for outputting an image using all toners or inks is changed to the setting regarding an operation of Print using black. For another example, the image forming apparatus may output information indicating that the setting for outputting a document using black toner or ink is changed to a print setting for performing an operation of Print using other toner. The image forming apparatus may display information indicating that the print setting has been changed on the display. The image forming apparatus may transmit information indicating that the print setting has been changed to be displayed by the host device to the host device.

FIG. 11 is a view illustrating a period in which an image forming apparatus is to identify a quality of a printout according to an example. In order to reduce a user's inconvenience, a period for identifying the quality of a printout by using a scanning module may be adjusted.

Referring to FIG. 11, a host device or an image forming apparatus may receive a user input for setting a period in which the image forming apparatus identifies a quality of the printout. For example, a period in which the image forming apparatus identifies the quality of a printout may be Every page, Every job, Daily, Specified period, and Do not check shortage.

Every page may refer to a period in which the image forming apparatus identifies the quality of each page of a printout.

Every job may refer to a period in which the image forming apparatus identifies the quality of each first page of each printout.

Daily refers to a period in which the image forming apparatus identifies the quality for a first print job every day (e.g., a first page of a first print job).

Specified period refers to a period in which the image forming apparatus identifies the quality every time set by a user. For example, 48 hours input by a user may be a period in which the image forming apparatus identifies the quality.

Do not check shortage is a setting in which the image forming apparatus does not identify the quality of a printout.

The host device or the image forming apparatus may provide a user with a user interface to receive the user input for setting a period. For example, the host device or the image forming device may display a window 1100 for setting a period on a display. The host device or the image forming apparatus may receive a user input for setting a period through a user interface that receives a user input such as a touch screen or a keypad.

The host device may transmit a period set based on a user input to the image forming apparatus. For example, the host device may transmit a PJL including information about a period to the image forming apparatus. The image forming apparatus may store information about the transmitted period in a memory.

The image forming apparatus may identify the quality of a printout and cartridge status information every set period.

According to the above-described examples, the image forming apparatus may obtain cartridge status information based on a result of identifying a quality of a printout. In addition, a user may easily detect information about the necessity of replacing a cartridge and information about a trouble that has occurred in the cartridge, and may replace the cartridge in a timely manner so that the quality of a printout is maintained.

Moreover, the above-described example operating methods of an image forming apparatus may be implemented in the form of a non-transitory computer-readable storage medium storing instructions or data executable by a computer or a processor. The examples may be written as computer programs and may be implemented in general-use digital computers that execute programs using the non-transitory computer-readable storage medium. The non-transitory computer-readable recording medium may include read only memory (ROM), random access memory (RAM), flash memory, CD-ROMs, CD-Rs, CD+Rs, CD-DVD-Rs, DVD-Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, or solid-state disks (SSD), and may be any device capable of storing machine readable instructions, associated data, data files, and data structures, and providing the machine readable instructions, associated data, data files, and data structures to a processor or a computer such that the processor or computer may execute the instructions.

Although the examples have been described with reference to the accompanying drawings, various changes and modifications may be made therein. For example, the relevant results may be achieved based on the described technologies being performed in a different order than the described methods, and/or based on the described elements such as systems, structures, devices, and circuits being coupled or combined in a different form than the described methods or are replaced or substituted by other elements or equivalents.

It should be understood that examples described herein should be considered in a descriptive sense and not for purposes of limitation. Descriptions of features or aspects within each example should typically be considered as available for other similar features or aspects in other examples. While various examples have been described with reference to the figures, it will be understood that various changes in form and details may be made therein without departing from the spirit and scope as defined by the following claims.

What is claimed is:

1. An image forming apparatus comprising:
   a cartridge containing toner or ink;
   a print module;
   a scanning module;
   a processor; and
   a memory to store at least one instruction executable by the processor,
   wherein the processor is to execute the at least one instruction to:
      obtain remaining amount information about a remaining amount of the toner or ink;

control the print module to output a first printout using print data;
control the scanning module to obtain a printout image by scanning the first printout;
identify a quality of the first printout based on the printout image and the print data; and
obtain cartridge status information based on the identified quality of the first printout and the remaining amount information.

2. The image forming apparatus of claim 1, further comprising a communication module, wherein the processor is to execute the at least one instruction to:
identify cartridge status information indicating that the cartridge needs to be replaced due to insufficient remaining amount of the toner or ink or cartridge status information indicating that a trouble has occurred in the cartridge, based on the identified quality of the first printout and the remaining amount information; and
control the communication module to transmit and receive data with an external server that provides cartridges or an external server that provides customer management services, based on the cartridge status information.

3. The image forming apparatus of claim 1, further comprising a display,
wherein the processor is to execute the at least one instruction to control the display to display the obtained cartridge status information.

4. The image forming apparatus of claim 1, further comprising a communication module, wherein the processor is to execute the at least one instruction to transmit the cartridge status information to a host device using the communication module, wherein the host device is to display a status of the cartridge.

5. The image forming apparatus of claim 1, wherein the processor is to execute the at least one instruction to:
change a print setting based on the cartridge status information; and
control the print module to output a second printout based on the changed print setting.

6. The image forming apparatus of claim 1, wherein the processor is to execute the at least one instruction to identify the quality of the first printout at a preset period.

7. The image forming apparatus of claim 1, wherein the scanning module is located in a downstream direction of the print module to obtain the printout image and comprises an inline scanner located in an upstream direction of a paper discharger from which a printout is discharged downstream of the print module.

8. The image forming apparatus of claim 1, wherein the processor is to execute the at least one instruction to:
obtain first dithered data from the print data;
obtain second dithered data from the printout image; and
identify a quality of a first printout by comparing the first dithered data with the second dithered data.

9. The image forming apparatus of claim 8, wherein the processor is to execute the at least one instruction to:
identify a first area within the first dithered data;
identify a second area within the second dithered data, wherein the second area corresponds to the first area;
identify a number of pixels in the first area;
identify a number of pixels in the second area; and
identify the quality of the first printout by comparing the number of pixels in the first area and the number of pixels in the second area.

10. The image forming apparatus of claim 9, wherein the processor is to execute the at least one instruction to:
identify the quality of the first printout from a result of comparing a print quality value that is a ratio of the number of pixels in the first area to the number of pixels in the second area with a threshold value; and
obtain cartridge status information indicating that the cartridge needs to be replaced based on the identified quality of the first printout and the remaining amount information that is less than a certain value.

11. An operating method of an image forming apparatus, the operating method comprising:
obtaining remaining amount information about a remaining amount of toner or ink;
outputting a first printout using print data;
obtaining a printout image by scanning the first printout;
identifying a quality of the first printout based on the printout image and the print data; and
obtaining cartridge status information based on the identified quality of the first printout and the remaining amount information.

12. The operating method of claim 11, further comprising:
identifying cartridge status information indicating that the cartridge needs to be replaced due to insufficient remaining amount of the toner or ink or cartridge status information indicating that a trouble has occurred in the cartridge, based on the identified quality of the first printout and the remaining amount information; and
transmitting and receiving data with an external server that provides cartridges or an external server that provides customer management services based on the cartridge status information.

13. The operating method of claim 11, further comprising transmitting the cartridge status information to a host device using a communication module or displaying the cartridge status information.

14. The operating method of claim 11, further comprising:
changing a print setting based on the cartridge status information; and
outputting a second printout based on the changed print setting.

15. A non-transitory computer-readable storage medium storing instructions executable by a processor of an image forming apparatus, the computer-readable storage medium comprising:
an instruction to obtain remaining amount information regarding a remaining amount of toner or ink contained in a cartridge;
an instruction to output a first printout using print data;
an instruction to obtain a printout image by scanning the first printout;
an instruction to identify a quality of the first printout based on the printout image and the print data; and
an instruction to obtain cartridge status information based on the identified quality of the first printout and the remaining amount information.

* * * * *